United States Patent [19]
Spiegel et al.

[11] Patent Number: 6,119,948
[45] Date of Patent: Sep. 19, 2000

[54] WATER DRAW-OFF SYSTEM

[75] Inventors: Herbert Spiegel, Niederwerrn; Robert Boehm, Schonungen, both of Germany

[73] Assignee: Hage Fittings GmbH & Co. KG, Rodgau, Germany

[21] Appl. No.: 09/117,146

[22] PCT Filed: Jan. 21, 1997

[86] PCT No.: PCT/DE97/00106

§ 371 Date: Jul. 24, 1998

§ 102(e) Date: Jul. 24, 1998

[87] PCT Pub. No.: WO97/27524

PCT Pub. Date: Jul. 31, 1997

[30] Foreign Application Priority Data

Jan. 24, 1996 [DE] Germany .......................... 196 02 377

[51] Int. Cl.[7] .............................. G05D 23/13; E03B 31/00
[52] U.S. Cl. .................................. 236/12.12; 137/625.41; 236/94
[58] Field of Search .................... 236/94, 12.12, 236/12.17

[56] References Cited

U.S. PATENT DOCUMENTS

| 2,069,040 | 1/1937 | Lodder | 236/12.17 |
|---|---|---|---|
| 3,721,386 | 3/1973 | Brick et al. | 236/12.12 |
| 4,630,940 | 12/1986 | Ostertag | 374/148 |
| 4,682,626 | 7/1987 | Bergmann | 137/551 |
| 5,174,495 | 12/1992 | Eichholz | 236/94 |
| 5,400,961 | 3/1995 | Tsutsui et al. | 236/12.12 |

FOREIGN PATENT DOCUMENTS

| 33 28 782 | 2/1985 | Germany . | |
|---|---|---|---|
| 35 13 549 | 9/1986 | Germany . | |
| 637051 | 5/1950 | United Kingdom | 236/12.17 |

Primary Examiner—William Wayner
Attorney, Agent, or Firm—Foley & Lardner

[57] ABSTRACT

A mixing device for hot and cold water having a mixing chamber formed in a circular—sector shaped cross section and having circumferentially spaced water inlet and an outlet. Within the camber is a circular-sector shaped mixing valve controlled in response to the mixed water temperature to thereby cover or open the inlets.

6 Claims, 3 Drawing Sheets

WATER DRAW-OFF SYSTEM

The invention relates to a system for drawing off service water from draw-off points such as washbasins or the like, where it is intended that cold, hot or warm water be available.

At the draw-off point, the desired amount of water at the desired temperature is set via a fitting, which in modern houses is often designed as a single-lever mixer fitting, via a rotary/pivoting movement of the lever. The temperature of the mixed warm water is determined by the rotary movement of the lever and is based on the experience of the user, since the temperature is primarily dependent on the temperature of the hot water that is available. In principle, therefore, there is the risk that the individual operating the fitting will be scalded.

In order to avoid scalding, DE 33 28 782 C3 discloses a device for measuring and indicating the temperature of the water flowing through the outlet of a sanitary fitting. The fitting is provided with a visible indicator which outputs a striking visual signal when a water temperature corresponding to the scalding limit is exceeded. To this end, a signal output by a temperature sensor and relating to the actual water temperature is compared electronically with the nominal temperature. A similar device is described in DE 35 13 549 C2.

Depending on the duration of the interruption between individual draw-off operations at a draw-off point, warm water at the desired temperature is not immediately available at the draw-off point after the fitting is opened. Depending on the duration of the interruption and the distance of the draw-off point from the warm water store, a certain time interval elapses until the water that has cooled down in the meantime in the hot water line is replaced by hot water. What flows initially is, therefore, cold or lukewarm water, which can suddenly become hot. In the known systems, it is therefore disadvantageous that, although the actual temperature is determined and a visual warning is also given when the scalding limit is reached, the warning signal is given just immediately before the point in time at which the individual operating the fitting himself notices that the water being drawn off is becoming too hot. In order to counteract the risk of scalding, either the user must continuously keep the indicating device in sight, or the nominal temperature must be set so low that the warning is given in good time. However, here too, the visual warning is always coupled with the personal temperature sensitivity of the user, so that it is basically not necessary. In addition, before water is drawn off each time, either the desired nominal temperature must be set, which is quite complicated, or a nominal value must be set permanently. The individual setting of the nominal value for each draw-off operation is of course laborious and time-consuming, so that such a system finds only little acceptance with the consumer.

Based on this presentation of the problem, the water draw-off system is to be improved in such a way that water at the respectively individually desired temperature can be drawn off at the draw-off point in a simple way, and scalding is ruled out, given correct setting of the nominal temperature.

The solution to the problem is given by a water draw-off system having a hot water feed line and a cold water feed line, a mixing device for mixing hot water and cold water in an adjustable ratio, having a water draw-off device, which is connected to a temperature measuring device and in which an indicating element is integrated and indicates an adjustable nominal temperature, the actual temperature of the desired water being compared in the temperature measuring device with the set nominal temperature, in that the nominal temperature is adjustable via the draw-off device and the mixing device is provided with an external drive via which the ratio of hot and cold water is regulated according to the deviation of the actual temperature from the nominal temperature.

In this system, by contrast with conventional systems, the mixing device is separated from the draw-off device. Consequently, the mixing of the warm water does not necessarily have to take place in the fitting, but can be performed at any point before the draw-off point. The mixing device is preferably driven by an electric motor and receives its control signals from the temperature measuring device.

It is particularly advantageous if the nominal temperature is individually adjustable by pivoting a lever on the draw-off device. The draw-off device may have the appearance of a conventional single-lever fitting. The adjustment of the nominal temperature takes place as a result of the rotation of the lever, via, for example, a potentiometer that is integrated in the fitting. The mode of operation consequently corresponds to that of a conventional water draw-off system. The value once set is maintained, so that scalding is ruled out.

It is particularly advantageous if the set nominal temperature is indicated on a display that is integrated in the draw-off device. In this way, the user immediately has feedback as to whether the desired water temperature is also sufficient, and it is not excessively cold water that is drawn off. A limit to the maximum temperature can be predefined via the temperature measuring device, which ensures that a specific water temperature cannot be exceeded by the mixing device or can be exceeded only following the acknowledgement of a signal or the like.

A mixing device for use in the system has a mixing chamber, into which a hot water line and a cold water line open, and has a mixer which is arranged in the mixing chamber such that it can pivot about its vertical axis and which is provided with a drive, the mixing chamber having, at least in the region between [lacuna] an inner wall in the shape of a section of a circle, the mixer having an essentially circular-sector shaped cross section and its radial wall being adapted to the inner wall, and it being possible for each of the lines to be completely covered and opened by means of the pivoting movement of the mixer, there being play between the walls.

For a design of the mixer which is particularly favorable in terms of flow, the walls that bound the arcuate wall in the flow direction of the water are of concave design in the flow direction. Vortices and hence losses at the entry into the mixing chamber are effectively avoided in this way. The drive used is preferably an electric servomotor, which receives its signals from the temperature measuring device.

The invention is to be explained in more detail below with the aid of a drawing, in which:

FIG. 1 shows the sectional illustration through a fitting and its incorporation into the system, in a schematic illustration;

FIG. 2*a* shows the plan view of a fitting;

FIG. 2*b* shows the side view of the fitting according to FIG. 2*a;*

Figure 1:
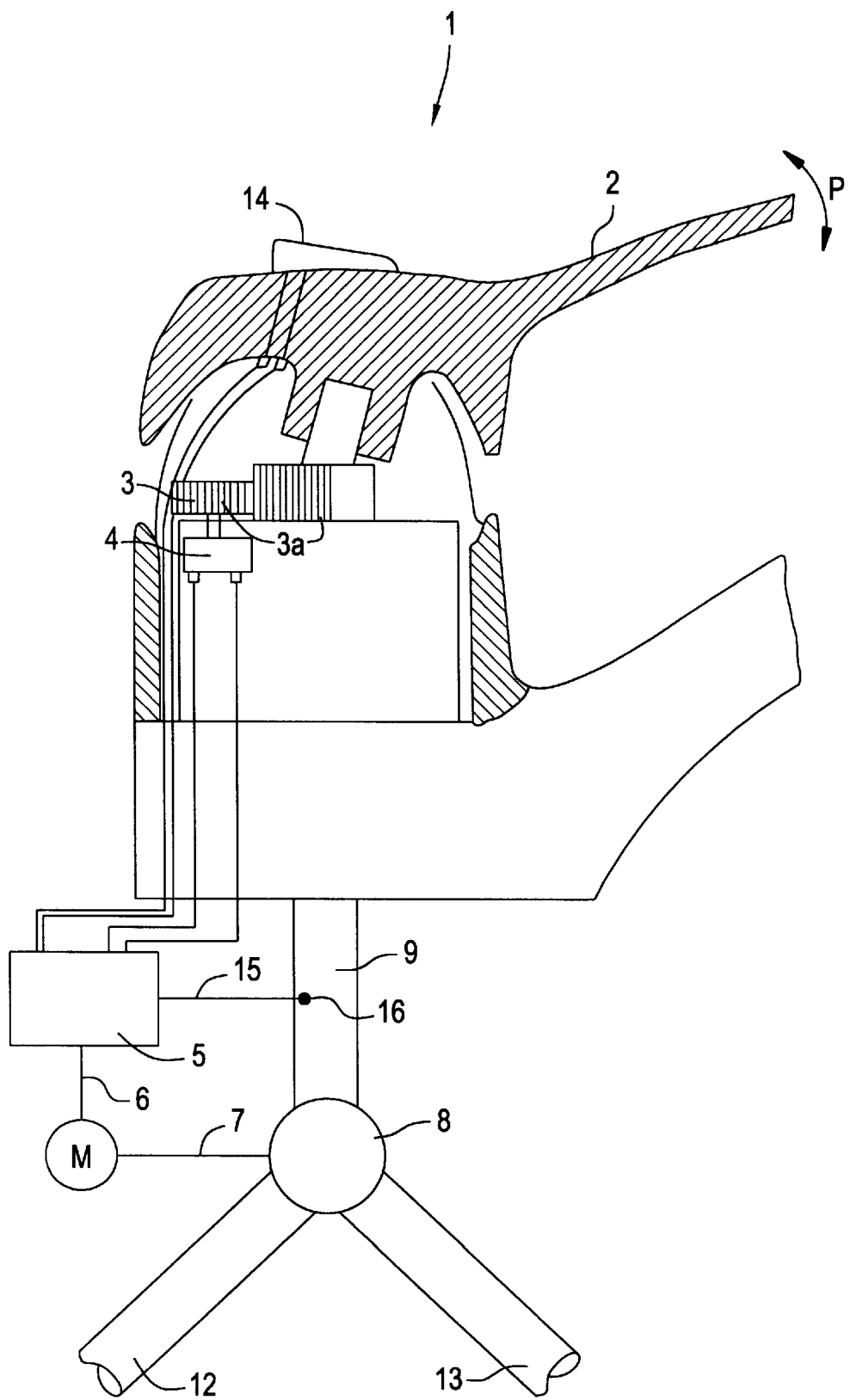
Figure 2A:
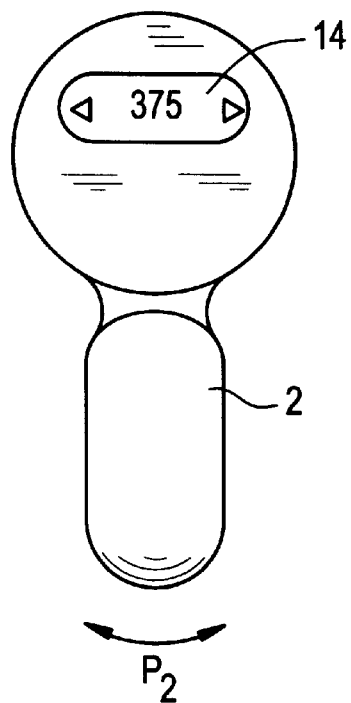
Figure 2B:
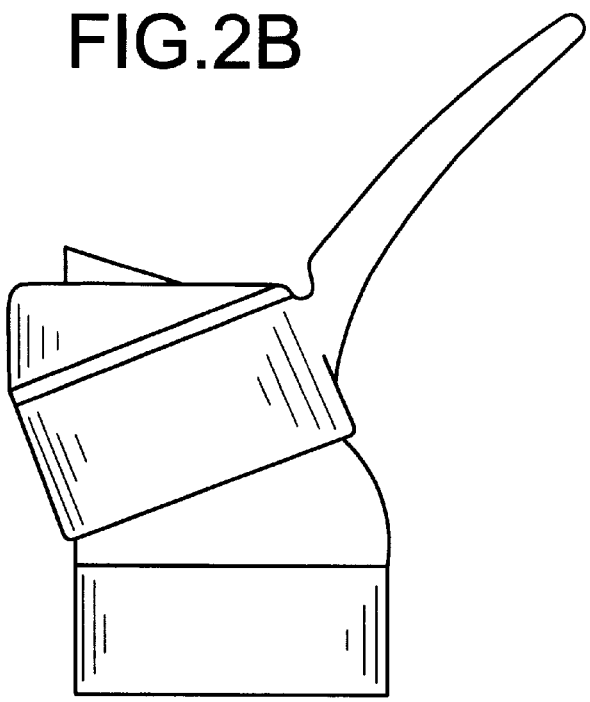
Figure 5:
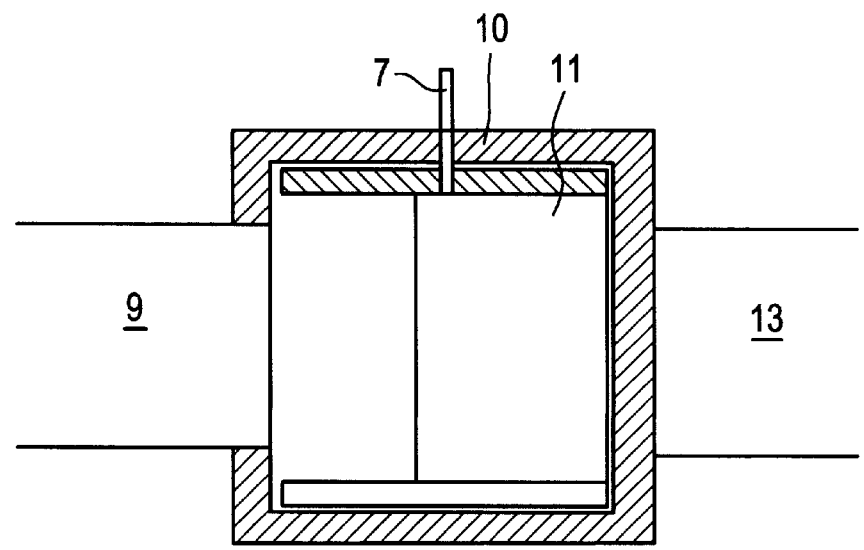
FIG. 5 shows the section along the line V—V according to FIG. 4.

FIG. 1 makes the water draw-off system clear. The fitting 1 is the draw-off device, which is provided in the conventional way on a washbasin or the like. The lever can be moved in a known way, up and down (arrow $P_1$) and to right and left (arrow $P_2$). The movement according to arrow $P_1$ controls the amount of water drawn off, and the temperature of the water is adjusted via the movement according to arrow $P_2$. The lever 2 is connected via a geared drive 3 a to a nominal value transmitter 3, which has a rotary potentiometer 4. A movement in the direction $P_2$ of the lever effects a change in the resistance of the rotary potentiometer 4. The rotary potentiometer 4 is connected to a temperature measuring device and evaluation unit 5 and to an indicating device 14. The indicating device 14 indicates the nominal value of the desired water temperature, which is increased in the event of a movement of the lever 2 in the clockwise direction and is decreased in the counterclockwise direction. In principle, a potentiometer of any constructional type can be used as the nominal value transmitter 3. The mechanical drive is determined in accordance with the respective constructional type. The temperature measuring device and evaluation unit 5 is operatively connected, as indicated by 6, to a servomotor M, which actuates the mixer 11 in the mixing device 8 via a shaft 7. From the mixing device 8, a water line 9 leads to the fitting 1, as indicated in FIG. 1 by the dashed line.

Figure 3:
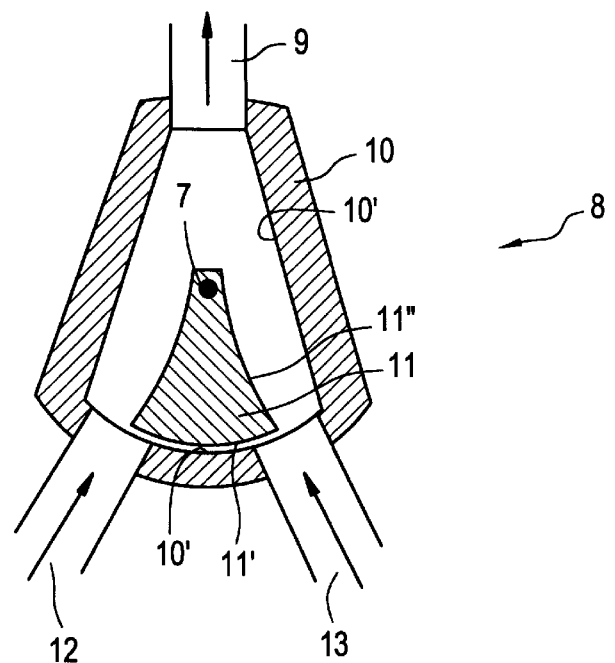
FIG. 3 shows the schematic illustration of an exemplary embodiment of the mixing device in section.
Figure 4:
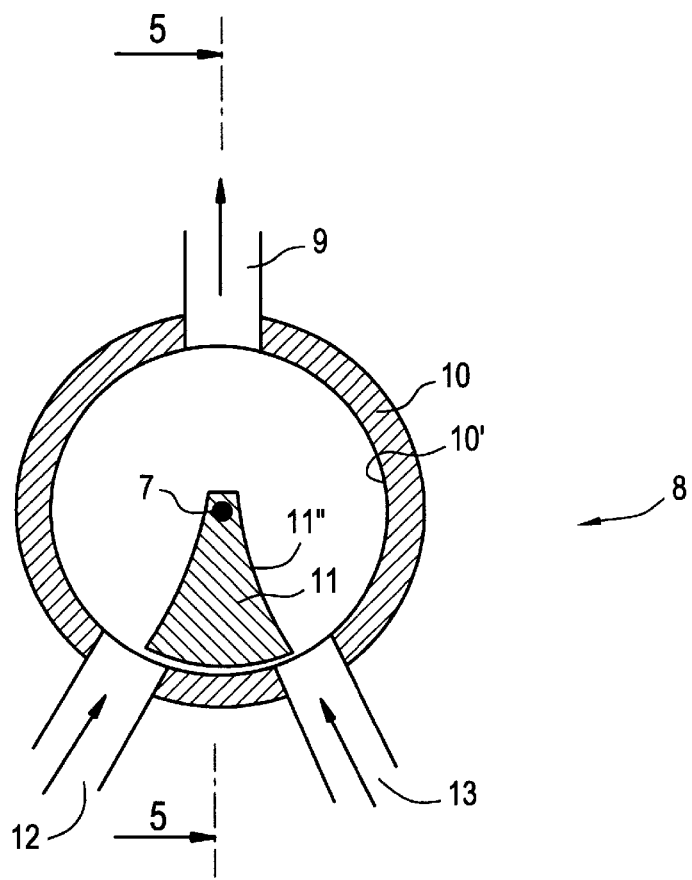
FIG. 4 shows a further exemplary embodiment of a mixing device in an illustration analogous to FIG. 3.

The basic construction of the mixing device 8 can be taken from FIGS. 3 and 4. The mixing chamber 10 of the mixing device 8 is provided with a hot water connection 12 and a cold water connection 13 and connected to the fitting 1 via the line 9, which is arranged diametrically opposite the connections 12, 13. The hot water line 12 and cold water line 13 open into the mixing chamber 10, preferably at an acute angle. At least the region between these lines has the shape, in cross section, of a section of a circle (FIG. 3). However, the mixing chamber 10 may also be of circular design in cross section (FIG. 4). The mixer 11 is pivotably arranged in the interior of the mixing chamber 10. That wall 11' of the mixer 11 which is assigned to the inner wall 10' of the mixing chamber 10 is configured to be arcuate such that it is adapted to the wall 10'. There is play between the wall 11' and the inner wall 10'. The walls 11" are curved concavely in the flow direction of the water, which direction is indicated by arrows in FIGS. 3 and 4, in order to present only a low flow resistance as the water enters the mixing chamber 10. The mixer 11 is connected to the servomotor M via a shaft 7. The mixing device 8 may be provided directly on the fitting 1 or may be located anywhere between the draw-off point and the warm water store. It will certainly be advantageous to fit the mixing device 8 underneath the washstand or the like that is provided with the fitting 1 but not specifically illustrated here.

The way in which the system functions is as follows:

The fitting 1 is operated by the user in the conventional way. Via the pivoting movement of the lever 2, the resistance of the rotary potentiometer 4 is changed, and a nominal value analogous to the pivoting movement $P_2$ is indicated on the nominal value indicator 14. In the temperature measuring device and evaluation unit 5, this nominal value is compared with the actual temperature of the water in the feed line 9. For this purpose, a temperature measuring sensor 16 is integrated in the feed line 9 and is connected to the temperature measuring device and evaluation unit 5 via a line 15. If the actual temperature is below the nominal temperature, the servomotor M is activated in such a way that the mixer 11 is pivoted such that the cold water line 13 is covered over further and, consequently, the hot water line 12 is opened more. If the actual temperature of the water in the feed line 9 rises above the nominal value, the mixer 11 pivots back and covers the hot water line 12 the more it opens the cold water line 13.

There is slight play between the walls 10' and 11'. As a result, the mixer 8 operates in an essentially wear-free manner. Since the temperature of the water is regulated, it is not absolutely necessary for the feed to the lines 12, 13 to have to be completely closable. Leakage losses are so low that they can be neglected in comparison with the demand for exclusively cold water or hot water.

List of reference symbols

| | |
|---|---|
| 1 | Fitting |
| 2 | Lever |
| 3 | Nominal value transmitter |
| 3a | Geared drive |
| 4 | Potentiometer |
| 5 | Temperature measuring device and evaluation unit |
| 6 | Line |
| 7 | Drive shaft |
| 8 | Mixing device |
| 9 | Feed line |
| 10 | Mixing chamber |
| 10' | Inner wall |
| 11 | Mixer |
| 11' | Wall |
| 11" | Wall |
| 12 | Hot water line |
| 13 | Cold water line |
| 14 | Nominal value indicator |
| 15 | Connecting line |
| 16 | Temperature sensor |
| M | Servomotor |
| $P_1$ | Arrow |
| $P_2$ | Arrow |

What is claimed is:

1. A mixing device in a water draw-off system having a hot water feed line and a cold water feed line, the water draw-off system having a water draw-off device which is connected to a temperature measuring and evaluation device, the draw-off device being integrated with an indicating element that indicates an adjustable nominal temperature, the mixing device comprising:

a mixing chamber, into which the hot water feed line and the cold water feed line open to each other at an acute; and a mixer, arranged in the mixing chamber such that it can pivot about its vertical axis and which is provided with a drive, wherein the mixing chamber having, at least in the region between the hot water feed line and the cold water feed line, an inner wall in the shape of a section of a circle, the mixer having an essentially circular-sector shaped cross section and its radial wall being adapted to the inner wall, and each of the hot water feed line and the cold water feed line can be completely covered and opened by a pivoting movement of the mixer, wherein there being play between the inner wall and the radial wall, and wherein the mixer has arcuate walls in a flow direction of the water, that are of concave shape in the flow direction.

2. The mixing device according to claim 1, wherein the mixer is driven by an electric servomotor.

3. The mixing device according to claim 1, wherein the mixer is driven by an electric motor which receives control signals from the temperature measuring and evaluation device.

4. The mixing device according to claim 1, wherein the draw-off device includes a pivotable lever that pivots to set the nominal temperature.

5. The mixing device according to claim 1, wherein the mixer having the circular-sector shaped cross section is formed as a wedge-shaped single block.

6. The mixing device according to claim 5, wherein the arcuate walls of mixer are formed on opposite side of the wedge-shaped single block mixer in the flow direction of the water.

* * * * *